(12) United States Patent
Scheich

(10) Patent No.: US 12,003,840 B2
(45) Date of Patent: Jun. 4, 2024

(54) LIGHT EMITTING DIODE FIXTURES FOR VEHICLE PHOTOGRAPHIC SYSTEMS

(71) Applicant: Carvana, LLC, Tempe, AZ (US)

(72) Inventor: Davo Scheich, Troy, MI (US)

(73) Assignee: Carvana, LLC, Temple, AZ (US)

(*) Notice: Subject to any disclaimer, the term of this patent is extended or adjusted under 35 U.S.C. 154(b) by 0 days.

(21) Appl. No.: 17/635,746

(22) PCT Filed: Jul. 29, 2020

(86) PCT No.: PCT/US2020/043966
§ 371 (c)(1),
(2) Date: Feb. 16, 2022

(87) PCT Pub. No.: WO2021/021864
PCT Pub. Date: Feb. 4, 2021

(65) Prior Publication Data
US 2022/0311919 A1    Sep. 29, 2022

Related U.S. Application Data

(60) Provisional application No. 62/880,313, filed on Jul. 30, 2019.

(51) Int. Cl.
*H04N 23/56* (2023.01)
*G03B 15/03* (2021.01)
(Continued)

(52) U.S. Cl.
CPC ............. *H04N 23/56* (2023.01); *G03B 15/03* (2013.01); *G06K 7/10297* (2013.01); *H04N 23/62* (2023.01); *H04N 23/66* (2023.01)

(58) Field of Classification Search
CPC .. F21V 29/67; F21Y 2105/16; F21Y 2115/10; G03B 15/03; G03B 15/07;
(Continued)

(56) References Cited

U.S. PATENT DOCUMENTS 9,039,223 B2 * 5/2015 Rudd ..................... F21V 29/507
362/249.02
9,096,168 B2 * 8/2015 Kuang ................... H05B 45/56
(Continued)

FOREIGN PATENT DOCUMENTS

KR        101121752 B1     3/2012
KR       20140013740 A     2/2014

OTHER PUBLICATIONS

Int'l Search Report for PCT/US2020/043966, dated Nov. 11, 2020.

*Primary Examiner* — Amy R Hsu
(74) *Attorney, Agent, or Firm* — SNELL & WILMER L.L.P.

(57) ABSTRACT

A modular lighting fixture is provided for use in photographic chambers that provides a combination of high flux, the ability to place/tuck the lighting fixture against a wall, and the ability to flash/tune the lighting fixture dynamically. The lighting fixture is based on light emitting diode elements to provide an energy efficient light source that generates far less heat than traditional mercury arc based lamps. The lighting fixture is modular and can be daisy chained to supply power and/or control signals to multiple attached lighting fixtures. Individual lighting fixtures may be joined together to form an array of lighting fixtures. The lighting fixtures may utilize the digital multiplex DMX512 standard for digital communication networks for controlling the lighting elements within the fixtures. The lighting fixture has a light output that is capable of providing a wide beam angle.

20 Claims, 15 Drawing Sheets

(51) Int. Cl.
*G06K 7/10* (2006.01)
*H04N 23/62* (2023.01)
*H04N 23/66* (2023.01)

(58) Field of Classification Search
CPC ....... G03B 2215/0567; G06K 7/10297; H04N 23/56; H04N 23/62; H04N 23/66; H04N 23/90; H04N 7/181
See application file for complete search history.

(56) References Cited

U.S. PATENT DOCUMENTS

| | | | |
|---|---|---|---|
| 11,193,634 B2* | 12/2021 | Chien | F21V 14/02 |
| 2005/0077843 A1 | 4/2005 | Benditt | |
| 2005/0111234 A1* | 5/2005 | Martin | F21V 29/77 |
| | | | 362/555 |
| 2006/0114531 A1 | 6/2006 | Webb et al. | |
| 2010/0020536 A1* | 1/2010 | Bafetti | F21V 29/502 |
| | | | 362/231 |
| 2010/0027276 A1 | 2/2010 | Kornitz et al. | |
| 2010/0177519 A1* | 7/2010 | Schlitz | F21V 29/70 |
| | | | 417/48 |
| 2011/0140633 A1* | 6/2011 | Archenhold | F21V 21/048 |
| | | | 362/249.06 |
| 2013/0313959 A1* | 11/2013 | Kerber | F21V 29/63 |
| | | | 165/185 |
| 2015/0300624 A1* | 10/2015 | Favarolo | F21S 8/06 |
| | | | 362/373 |
| 2016/0040837 A1* | 2/2016 | Kallas | H05B 45/00 |
| | | | 362/11 |
| 2016/0245493 A1* | 8/2016 | Eustace | F21V 29/81 |
| 2017/0352605 A1* | 12/2017 | Bilan | F21V 29/76 |
| 2018/0012350 A1* | 1/2018 | Gangitano | G01N 21/8806 |
| 2019/0267825 A1* | 8/2019 | Chien | F21S 6/00 |
| 2019/0353341 A1* | 11/2019 | Spiro | F21K 9/275 |

* cited by examiner

OR

LIGHT EMITTING DIODE FIXTURES FOR VEHICLE PHOTOGRAPHIC SYSTEMS

RELATED APPLICATIONS

This application claims priority benefit of U.S. Provisional Application Ser. No. 62/880,313 filed 30 Jul. 2019, the contents of which are hereby incorporated by reference.

FIELD OF THE INVENTION

The present invention in general relates to a system for photographing vehicles; and in particular, to a modular light fixture for use in photographic enclosures for vehicle photography.

BACKGROUND OF THE INVENTION

Online auto sales and auto auctions have been growing in popularity. One of the most popular online auctions to buy vehicles from is eBay™. On eBay Motors™, a user can create an account and put their vehicles up for auction. Other popular websites include cars.com™ Typically, online vehicle sales are based solely on images of the vehicle, since the buyer is in a remote location and is unable to view the vehicle in question in person. Thus, many high quality images are required of the vehicle from many perspectives to allow a buyer to gain an understanding of a subject vehicle's condition and appearance. FIGS. 1A and 1B are line drawings of typical non-studio quality vehicle photographs that are used to list vehicles for sale. The images shown in FIGS. 1A and 1B are of low quality and require a dedicated employee to move vehicles and physically move around the subject vehicle to take the pictures. FIG. 1C illustrates reflection of the floor on the surfaces of the vehicle. The photographer also has to manually collate the images, name, and upload the files, which is a labor intensive and time consuming task, considering one photographer may be required to shoot upwards of 75 vehicles a day.

Furthermore, producing high quality images is not only time consuming, but is costly and requires a studio set up. Vehicle images are particularly hard to obtain without unwanted reflections of the photographer or the surroundings; however reflection free images are critical to be able to discern surface imperfections, scratches, and dents on a vehicle surface. FIGS. 2A and 2B illustrate an existing studio configuration 1 for generating a contrast break line 2 on a vehicle with additive lighting. The bottom edge 4 of a light box 6 creates the break line 2 between highlight and shadow. FIGS. 3A and 3B illustrate an existing studio configuration 8 for generating a contrast break line 2 on a vehicle with subtractive lighting. The bounce fill light is a large source and makes a soft reflection in the sheet metal. A gray wall is added to "subtract" the reflection from the lower half of the truck to create contrast and shape.

While these studio shots are effective in creating high quality vehicle images, the studio shots are not amenable to the high throughput required for high volume vehicle sales. Thus there is a need to be able to rapidly produce high quality reflection free images of vehicles from multiple angles and perspectives.

In order to increase throughput for creating high quality vehicle images a drive through photographic tunnel as disclosed in U.S. Pat. No. 10,063,758 issued Aug. 28, 2018 and a circular dome photographic booth as disclosed in U.S. patent application Ser. No. 15/834,374 filed Dec. 7, 2017 both of which are included herein in their entirety have been implemented. Both the photographic tunnel and circular dome have a plurality of cameras mounted within the walls for recording images of a vehicle that are uploaded to a database that is used to generate image data from the vehicle positioned in the structure. The systems further include a lighting system and a tracking system to actuate one or more of the plurality of cameras and lights in a predetermined sequence and combination based on the position of the vehicle within the photographic structure.

U.S. Pat. No. 9,046,740 discloses a vehicle photographic studio with a stationary circular platform a vertical upright curved wall defining a backdrop that partially surrounds the platform, a front curved overhead member mounted across a side opening in the wall, and a plurality of spaced apart rollers rotatably mounted on a lower end portion of the wall and engaged with the track so as to mount the wall upon the track for undergoing revolvable movement along the track and about the platform to relocate the side opening of the wall at any selected angular position in relation to the platform.

However, these existing vehicle photographic solutions utilize lighting systems that have lighting elements that do not provide a combination of high flux, the ability to place/tuck the lighting element against a wall, and the ability to flash/tune the lighting element dynamically. Existing strobe lights 10 are shown in a vehicle photographic booth in FIGS. 4A-4D. The strobe lights 10 are shown positioned or mounted behind a gray wall 12, and projecting light on to a wall 14. However, the strobe lights 10 generate bright light using mercury arc elements that are very hot and need to be well ventilated and cannot be placed against surfaces in order to avoid overheating or fire. Furthermore, mercury arc lights and other intense flux lights lack the ability to flash or tune dynamically.

Thus, there continues to be need for improved lighting fixtures for use in photographic chambers that provide a combination of high flux, the ability to place/tuck the lighting element against a wall, and the ability to flash/tune the lighting element dynamically.

SUMMARY OF THE INVENTION

A modular light fixture is provided. The modular light fixture includes a housing, a heatsink secured to the housing with securements, and a lighting lens supported on the heatsink that contains an array of light elements. One or more fans are within the housing, along with a set of power and data connections.

A vehicle photographic system is provided. The vehicle photographic system includes a photographic booth or structure, one or more cameras, one or more of the light fixtures as disclosed above, a computer workstation, and a controller for the one or more cameras and the one or more light fixtures.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

The present invention has utility as a modular lighting fixture for use in photographic chambers that provides a combination of high flux, the ability to place/tuck the lighting fixture against a wall, and the ability to flash/tune the lighting fixture dynamically. Embodiments of the inventive lighting fixture may be based on light emitting diode elements to provide an energy efficient light source that generates far less heat than tradition mercury arc based lamps. Embodiments of the inventive lighting fixture may be modular and may be daisy chained to supply power and/or control signals to multiple attached lighting fixtures. In a specific inventive embodiment individual lighting fixtures may be joined together to form an array of lighting fixtures. Specific inventive embodiments of the lighting fixtures may utilize the digital multiplex DMX512 standard for digital communication networks for controlling the lighting elements within the fixtures. In a specific inventive embodiment of the lighting fixture, light output is rated at 300 Watts (94 CRI) and is capable of providing a wide beam angle.

In addition to the use of inventive embodiments of the modular lighting fixture in photographic chambers, the modular lighting fixtures are also very good lights for lighting theatrical backgrounds and green screens. The high output and low profile of the modular lighting fixture allows the lighting fixtures to be easily hidden. Furthermore, the extra wide lenses allow that bright lights to be evenly spread and provide exceptional blending with a neighboring fixture.

It is to be understood that in instances where a range of values are provided herein, that the range is intended to encompass not only the end point values of the range, but also intermediate values of the range as explicitly being included within the range and varying by the last significant figure of the range. By way of example, a recited range of from 1 to 4 is intended to include 1-2, 1-3, 2-4, 3-4, and 1-4.

Figure 1A:
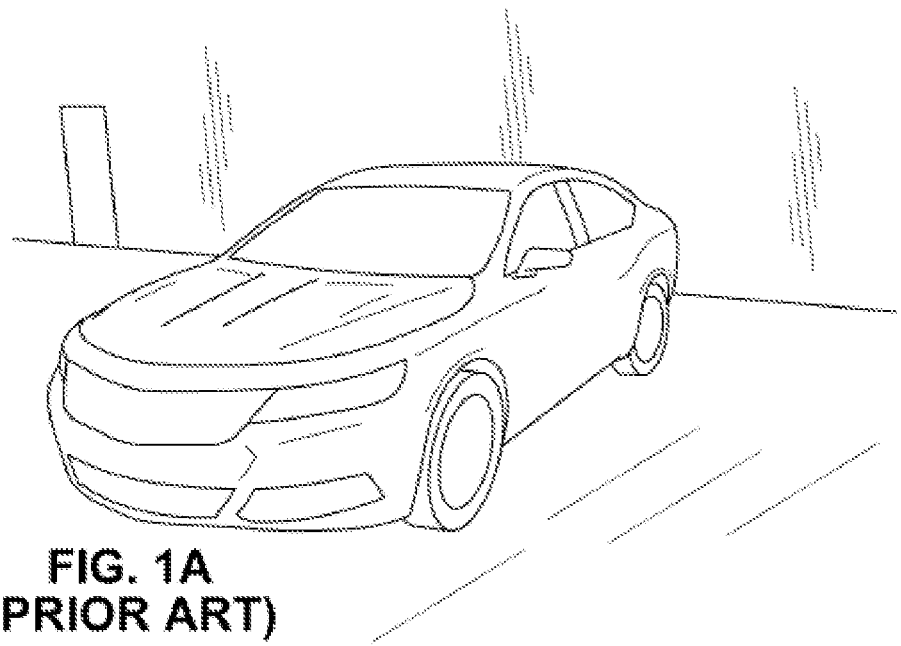
FIGS. 1A and 1B are typical non-studio quality vehicle photographs rendered as line drawings.
Figure 1B:
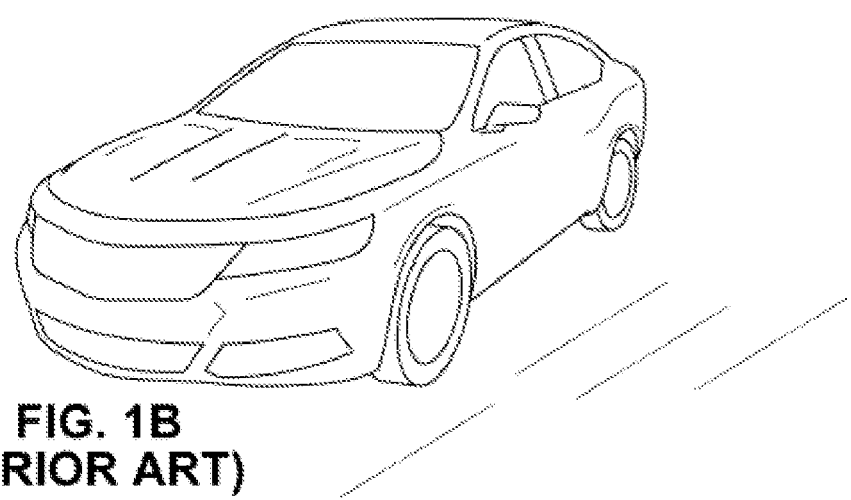
Figure 1C:
FIG. 1C illustrates a photograph of a studio shot with uncontrolled reflections in a vehicle surface.
Figure 2A:
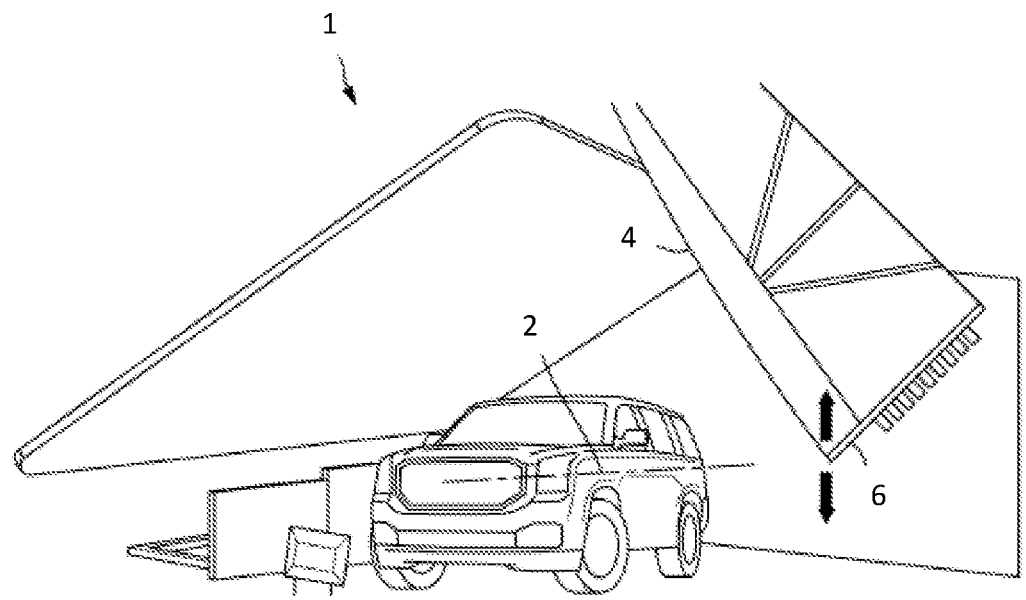
FIGS. 2A and 2B illustrate an existing studio configuration for generating a contrast break line photographs on a vehicle with additive lighting rendered as line drawings.
Figure 2B:
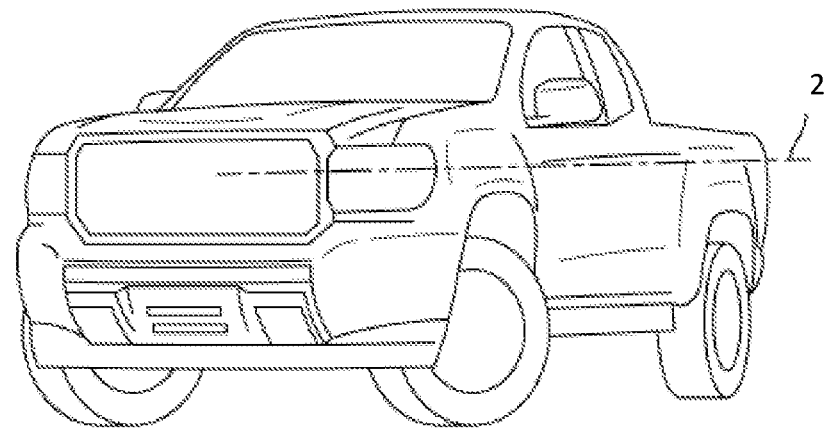
Figure 3A:
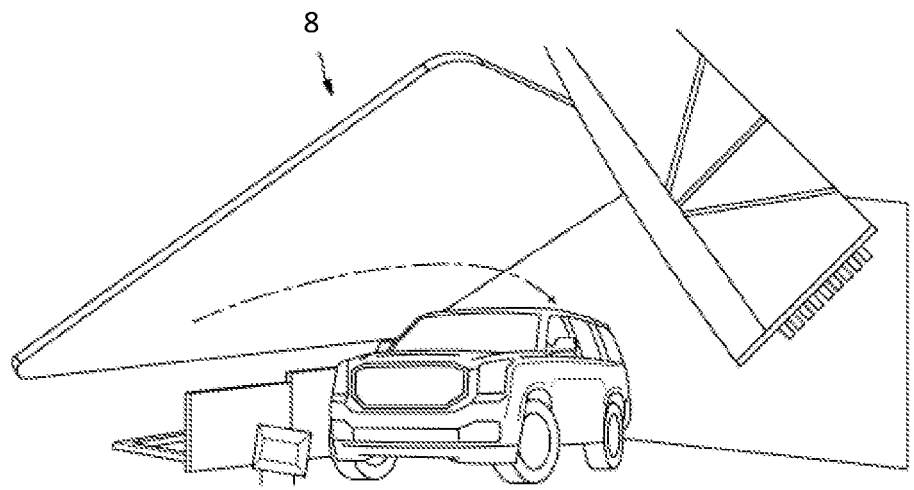
FIGS. 3A and 3B illustrate an existing studio configuration for generating a contrast break line photographs on a vehicle with subtractive lighting rendered as line drawings.
Figure 3B:
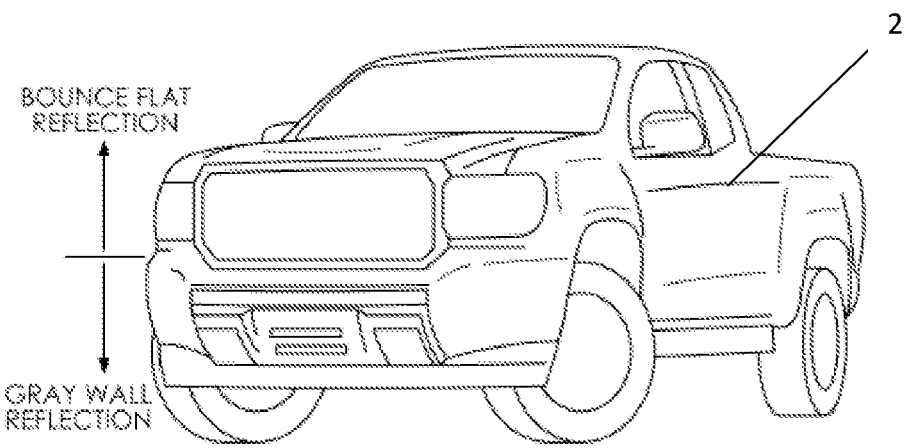
Figure 4A:
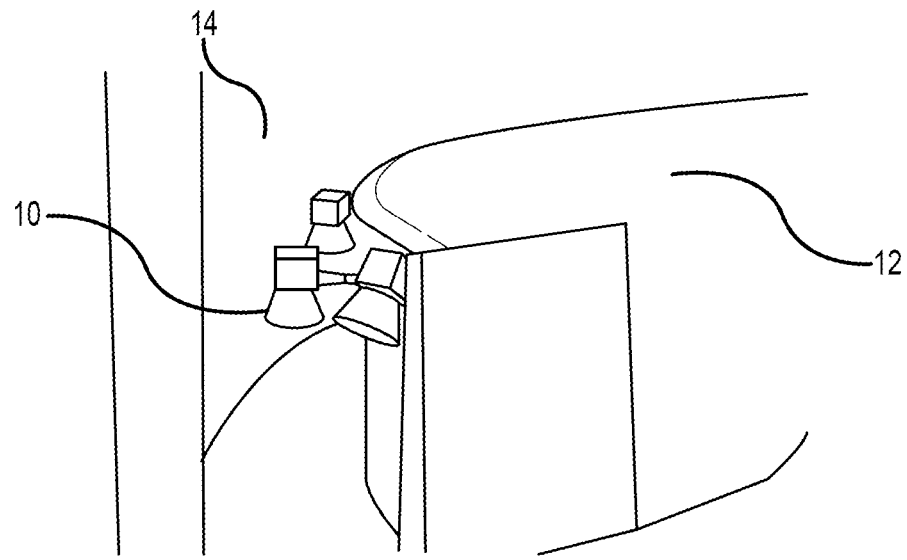
FIGS. 4A-4D illustrate the use of existing strobe lighting elements in a vehicle photographic booth.
Figure 4B:
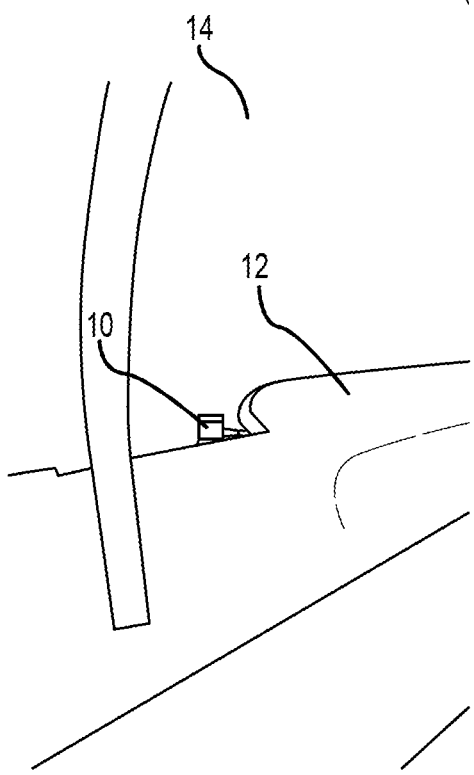
Figure 4C:
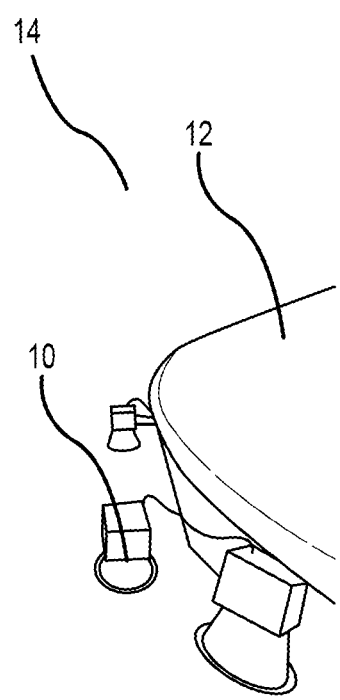
Figure 4D:
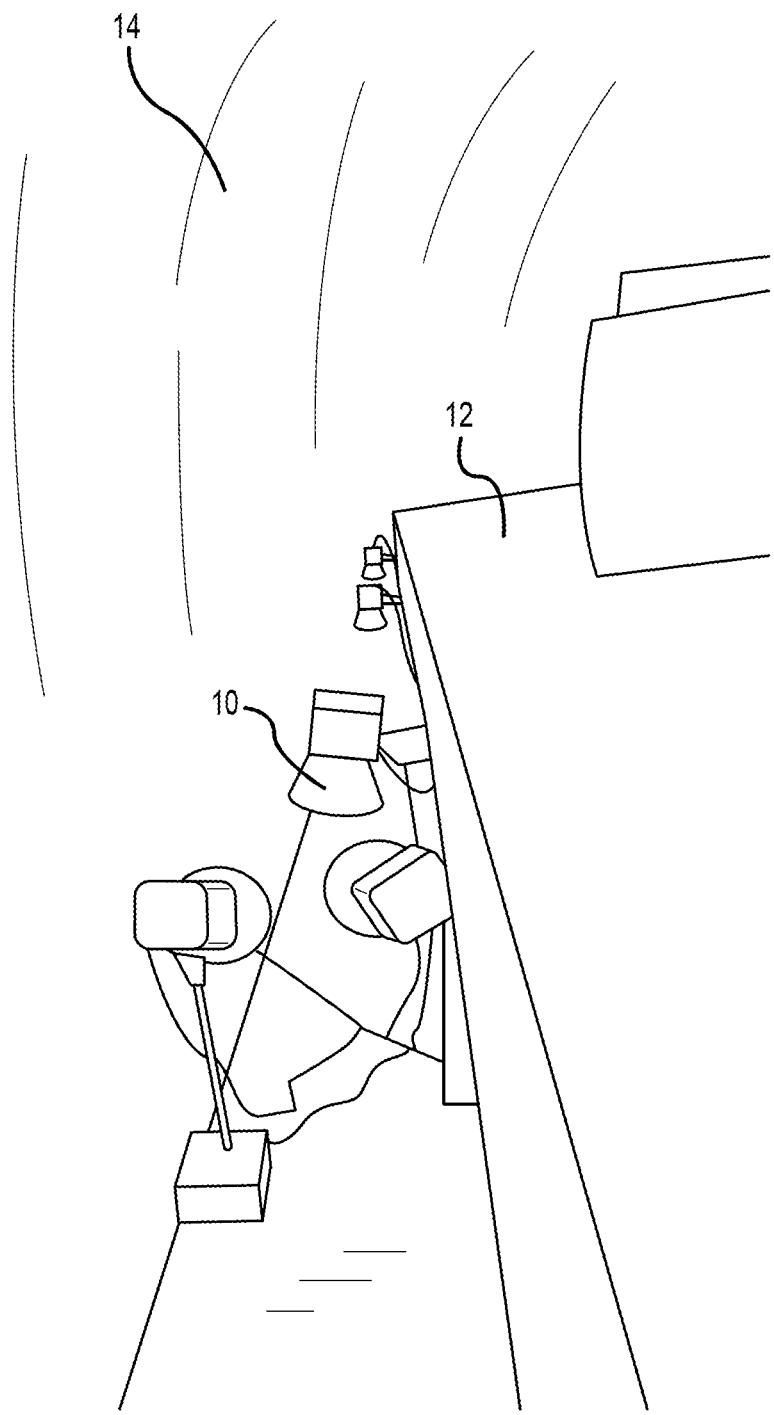
Figure 5A:
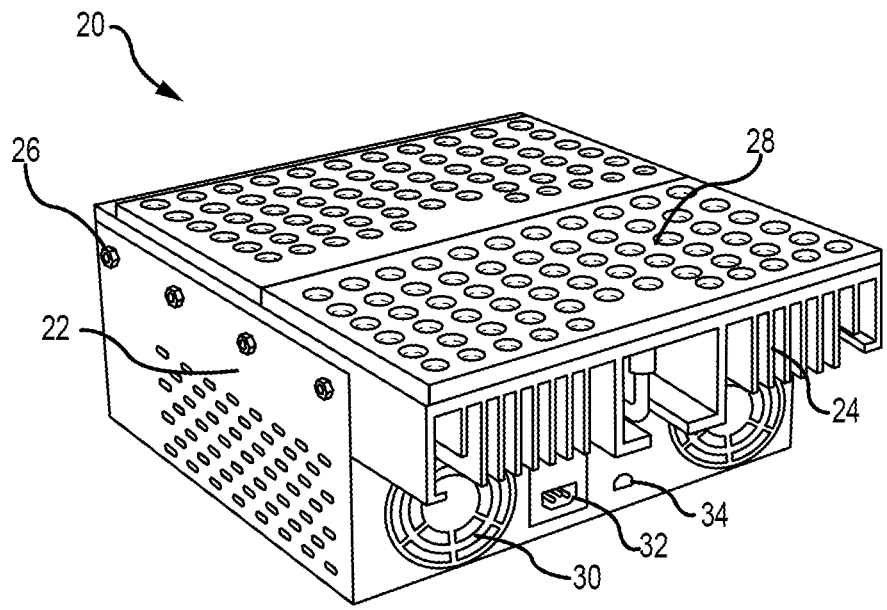
FIGS. 5A-5C are a series of perspective views of a modular light fixture in accordance with embodiments of the invention.
Figure 5B:
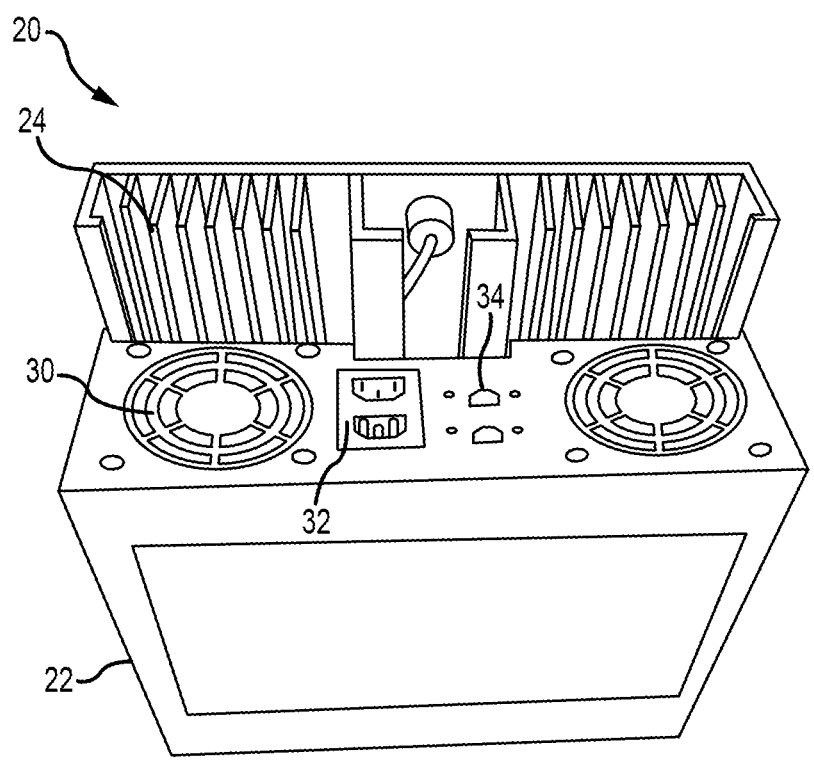
Figure 5C:
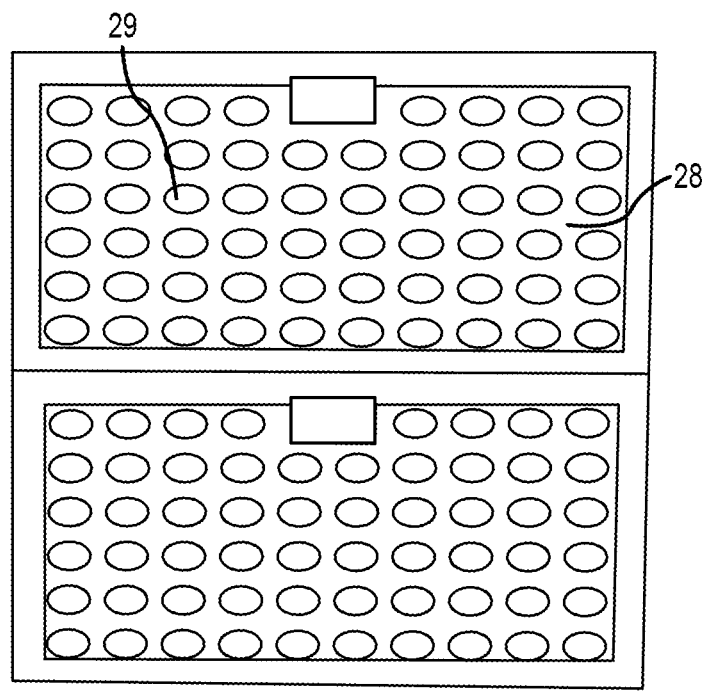

Referring now to the figures, FIGS. 5A-5C are a series of perspective views of an inventive embodiment of a modular light fixture 20. The modular light fixture 20 has a housing 22 that is secured to a heatsink 24 with securements 26. The heatsink 24 provides a surface that supports an array of lighting elements in a lighting lens 28. The heatsinks 24 spreads and dissipates heat generated by the lighting elements. One or more fans 30 provide cooling within the housing 22. Electrical connections 32 supply current to a transformer or power supply (not shown) within the housing 22. Control signal connections 34 supply signals for controlling the switching (on/off) and intensity and dimming of the array of lighting elements in a lighting lens 28. FIG. 5C is a top view of the lighting lens 28 that more clearly shows the array of individual lighting elements 29, which as previously noted may be light emitting diodes (LED) held in the lighting lens 28. The individual lighting elements 29 may be evenly spaced in a series of rows that form the array in the lighting lens 28. Different lighting lenses 28 may be used to create varying lighting effects. In a specific embodiment the color of the individual LEDs may be controlled.

Figure 6:
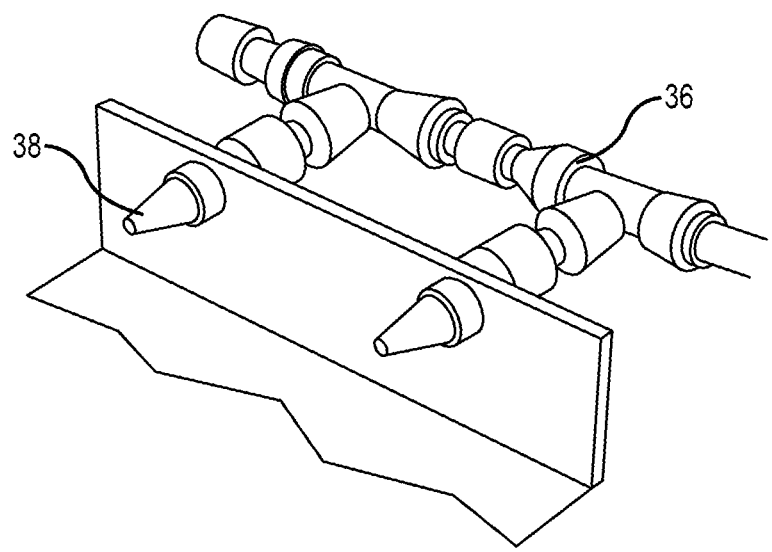
FIG. 6 illustrates air blower nozzles for cooling and for cleaning hard to reach fans in an array of modular light fixtures in accordance with embodiments of the invention.
Figure 11A:
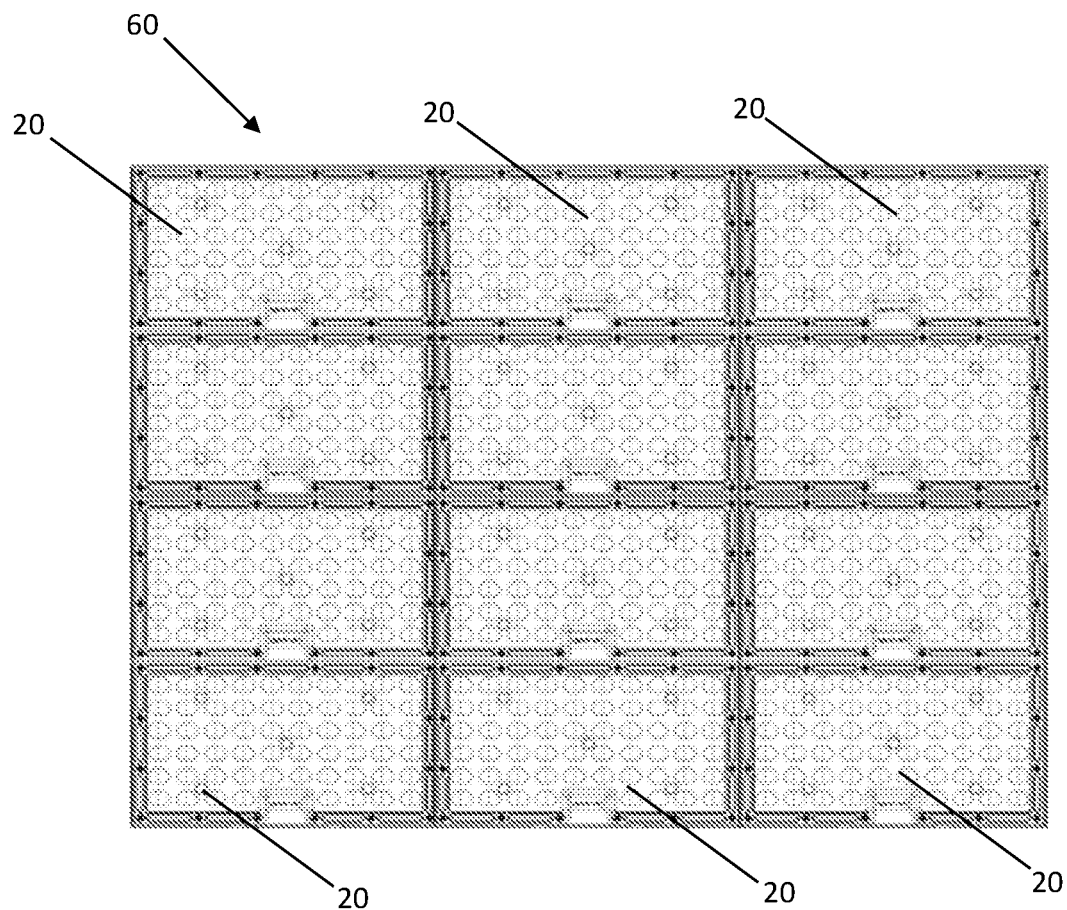
FIGS. 11A and 11B illustrate arrays and signal connections formed there between with the modular light fixtures of FIG. 5 in accordance with embodiments of the invention.
Figure 11B:
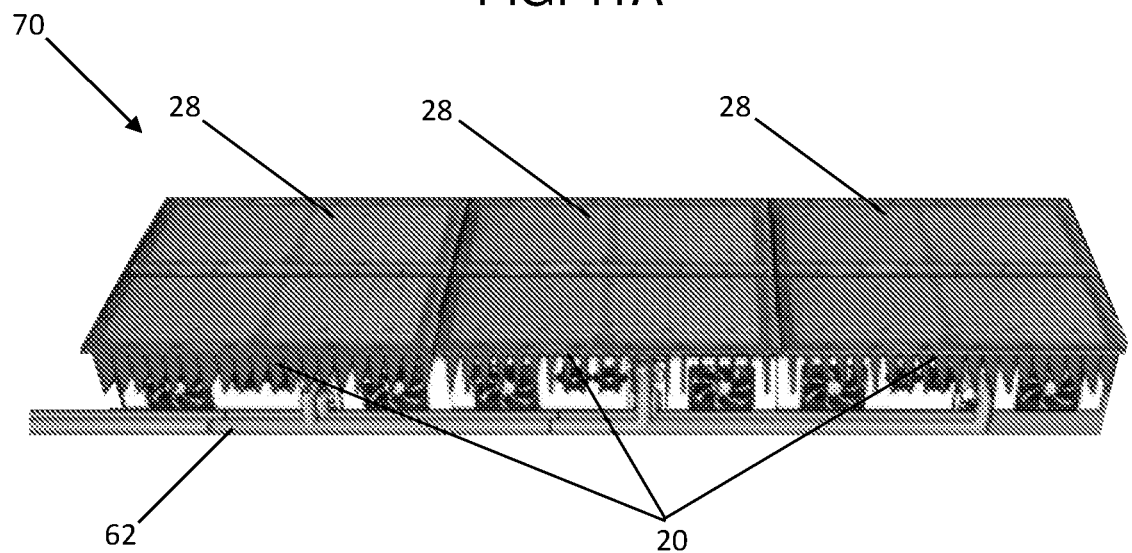

FIG. 6 is a perspective view of an airline 36 and nozzles 38 that may be used for self-cleaning in an array installation of lighting fixtures 20 as shown in FIGS. 11A and 11B. In an array installation the fans 30 of each lighting fixture 20 may be difficult to access for cleaning, and the nozzles 38 may provide a blast of air into a fan 30 on a periodic basis, for example hourly, to clear any dust or debris that may have accumulated in the vicinity of the fan 30. In addition to self-cleaning in specific inventive embodiments, a continuous low volume of air may be supplied to keep the housing 22 of the lighting fixture 20 extra cool.

Figure 7A:
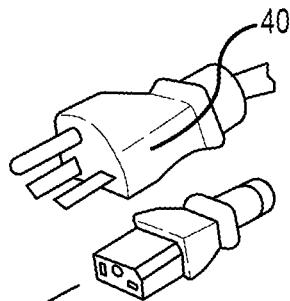
FIGS. 7A-7E illustrate power connections between the modular light fixtures of FIG. 5 according to an embodiment of the invention.
Figure 7B:
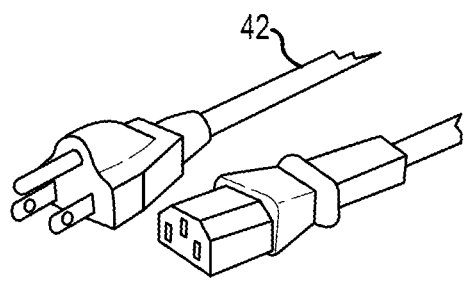
Figure 7C:
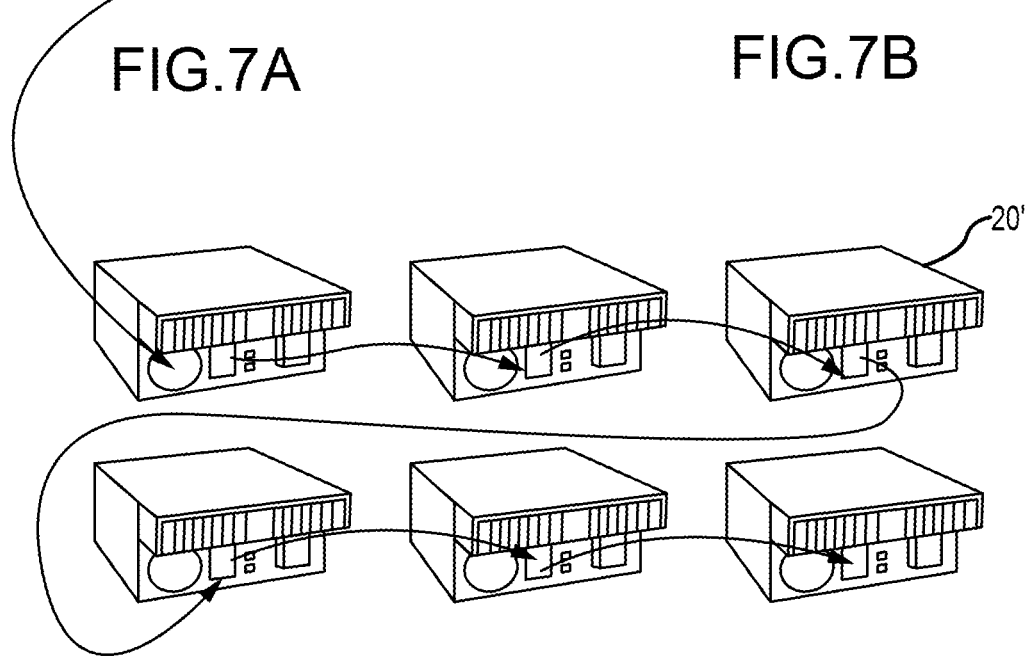
Figure 7D:
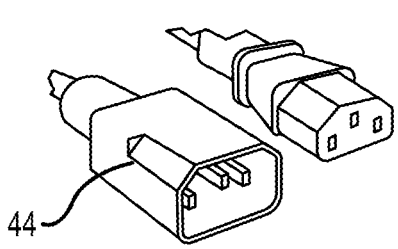
Figure 7E:
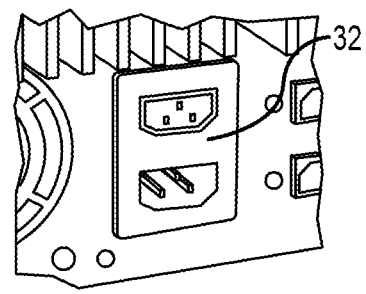

FIGS. 7A-7E illustrate power connections between the modular light fixtures 20. Inventive embodiments may use daisy chain power connections for simplified and quick installations. In a specific inventive embodiment using a 220 volt alternating current (VAC) power supply with a 20 amp rating up to sixteen lighting fixtures may be daisy chained or connected together. In 220 VAC operation a National Electrical Manufacturers Association (NEMA) 6-20P to International Electrotechnical Commission (IEC) C13 power cord 40, as shown in FIG. 7A, may be used to supply power to the first lighting fixture 20 in a daisy chain configuration, an example of which is shown in FIG. 7C. In a specific inventive embodiment using a 115 volt alternating current (VAC) power supply with a 15 amp rating up to six lighting fixtures may be daisy chained or connected together. In 115 VAC operation a NEMA 5-15P to IEC C13 power cord 42, as shown in FIG. 7B, may be used to supply power to the first lighting fixture 20 in a daisy chain configuration, an example of which is shown in FIG. 7C. In a specific inventive embodiment, each lighting fixture 20 draws a maximum of 2.5 amps at 115 VAC. In either 115 or 220 VAC operating configurations, an electrical cord, such as an IEC C14 to IEC C13 cord, and electrical junction connectors 32, as shown in close up in FIGS. 7D and 7E, respectively are used to establish connections between each of the lighting fixtures 20. It is appreciated that additional electrical standards may be used for power connection and distribution.

Figure 8A:
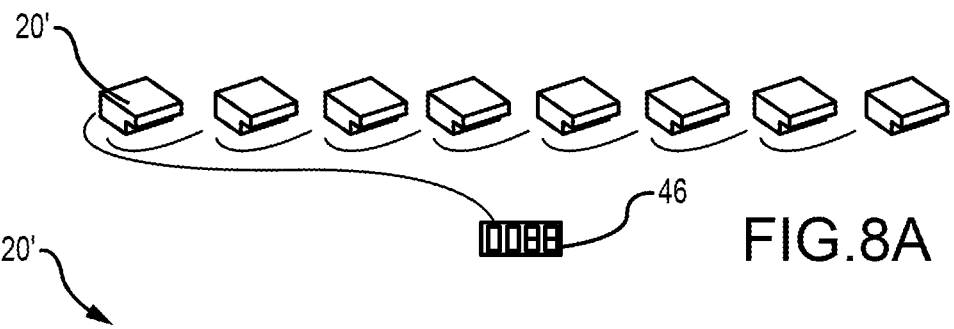
FIGS. 8A-8D illustrate control line connections between the modular light fixtures of FIG. 5 in accordance with embodiments of the invention.
Figure 8B:
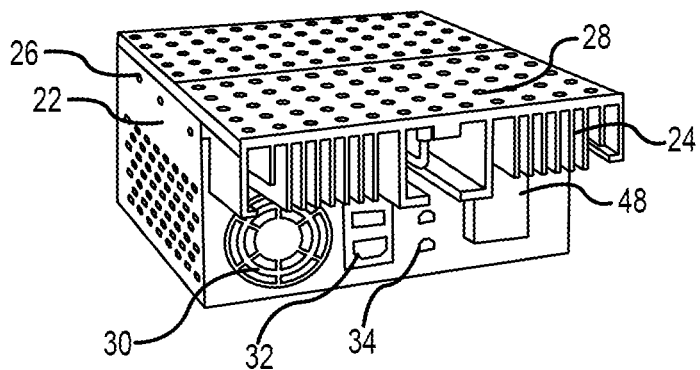
Figures 8C, 8D:
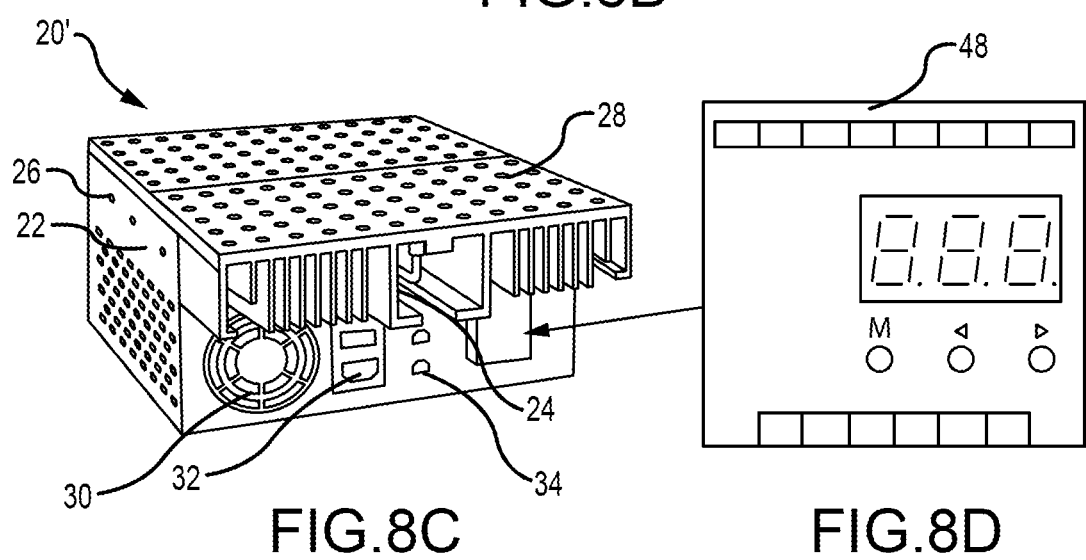

FIGS. 8A-8D illustrate control line connections between the modular lighting fixtures 20. In specific inventive embodiments the digital multiplex DMX 512 standard is used to send control signals to the lighting fixtures 20. FIG. 8A shows a standalone DMX 512 network controller 46 connected to a series of embodiments of the inventive lighting fixtures 20 in a daisy chain configuration. As best seen in FIGS. 8B and 8C data connection jacks 34 may be based on the RJ45 standard which is typically used with Ethernet cables. FIG. 8C shows an inventive embodiment of the lighting fixture 20' with a built in DMX 512 decoder or manual standalone controller 48. FIG. 8D is a close-up view of the decoder/controller 48. It is appreciated that additional signal control standards may be used for power connection and distribution.

Figure 9A:
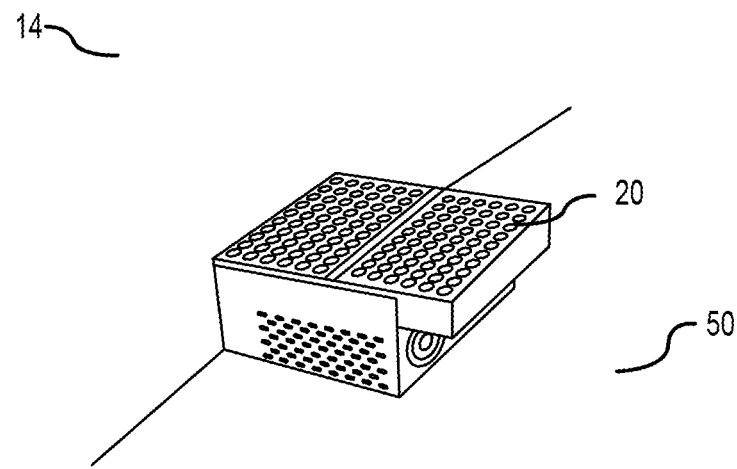
FIGS. 9A and 9B are pictures showing the placement of the modular light fixture of FIG. 5 on the floor and against a wall of a photographic chamber, and mounted to a VESA mount, respectively, in accordance with embodiments of the invention.
Figure 9B:
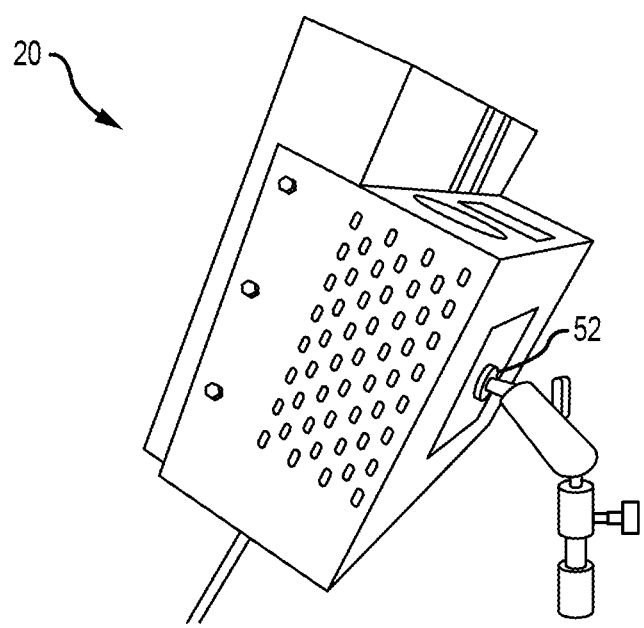

FIGS. 9A and 9B are pictures showing the placement of the modular light fixture 20 on the floor 50 and against a wall 14 of a photographic chamber, and mounted to an adjustable arm mount that may be compatible with a Video Electronics Standards Association (VESA) mount, respectively. The lay flat design of the modular light fixture 20 allows for minimal or no additional mounting hardware or brackets when resting on a flat surface. The lay flat/set-down design makes installing the modular light fixture 20 into a photographic booth or car stage fast and efficient with minimal labor with no additional hardware needed. As seen in FIG. 5B, a modular light fixture 20 may also be placed in a standing position with no additional hardware required.

Figure 10A:
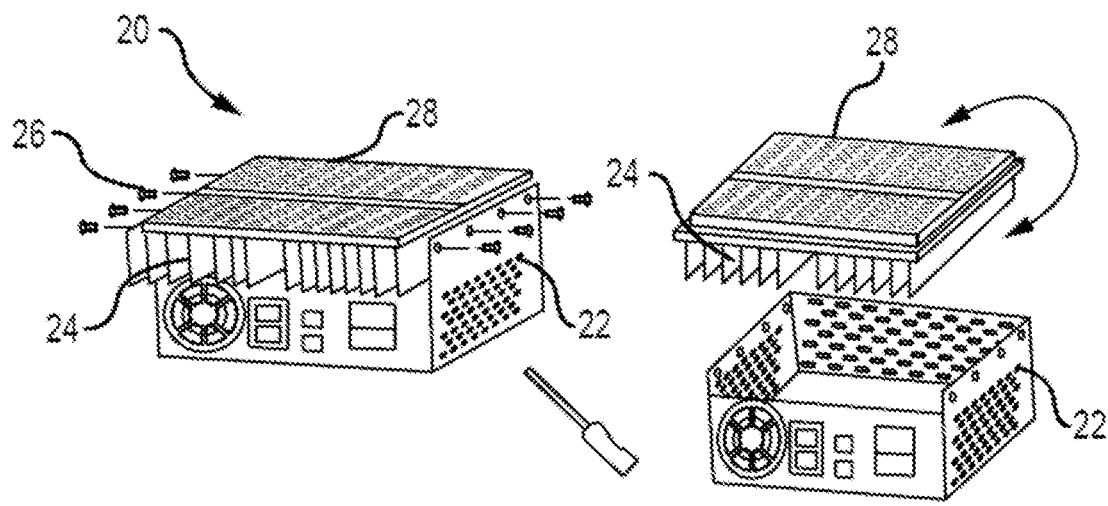
FIGS. 10A-10C illustrate the rotation of the lens assembly to change the spread of the light from the modular light fixture in accordance with embodiments of the invention.
Figures 10B, 10C:
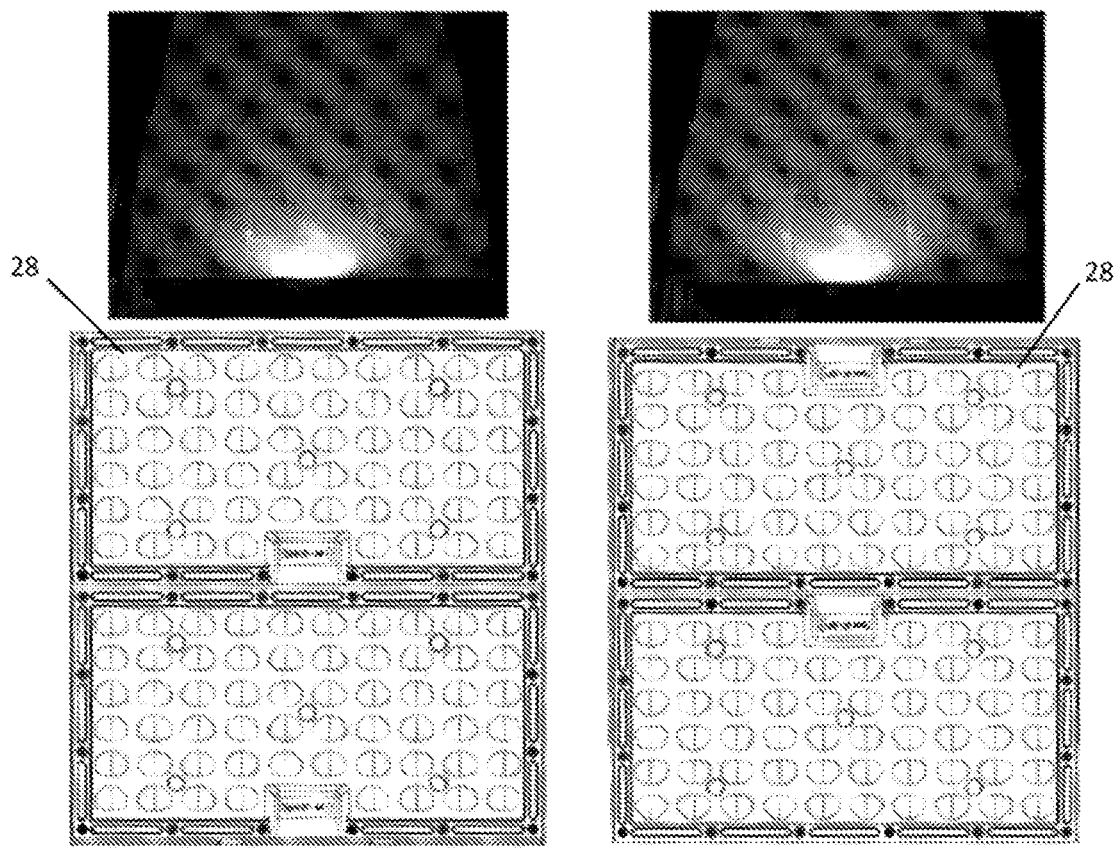
Figure 10D:
FIGS. 10D and 10E illustrate a naturally occurring sundog and a sundog generated in a photographic dome structure with an embodiment of the modular light fixture of FIG. 5, respectively.
Figure 10E:
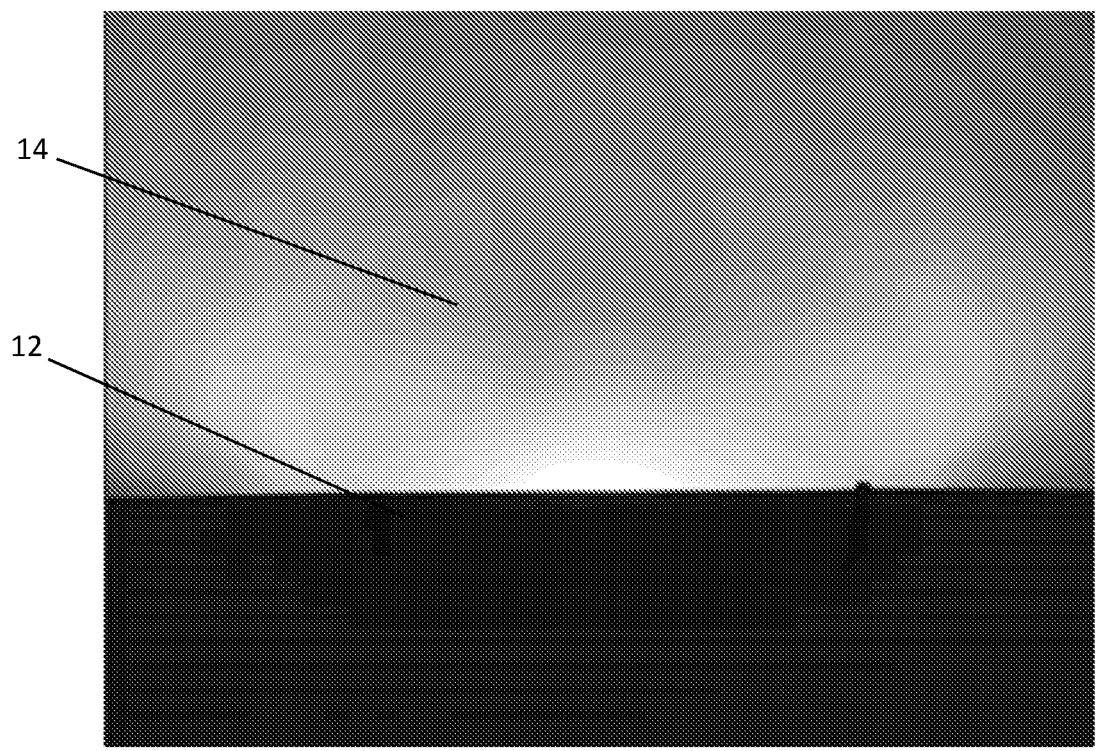

FIGS. 10A-10C illustrate the rotation of the lens assembly 28 to change the spread of the light from the modular light fixture. In FIG. 10A securements 26 are removed to detach the heatsink 24 with the mounted lighting lens 28. As further shown in FIG. 10A, the heatsink 24 is rotated 180 degrees to change the spread of the light. FIGS. 10B and 10C illustrate the differences in the light spread between the rotated lighting lens. The rotation of the heatsink 24 result in the flipping (rotation) of the lighting lens 28 which provides two lighting effects per each available lighting lens. FIG. 10D is a photograph of a naturally occurring sundog. A sundog is a concentrated patch of sunlight occasionally seen about 22° to the left or right of the sun. Sundogs often form in pairs on either side of the sun when sunlight refracts through icy clouds containing hexagonal platecrystals aligned with their large, flat faces parallel to the ground. In a specific embodiment the modular light fixture (20, 20') may be arraigned to mimic a sundog in a domed structure as shown in FIG. 10E where the light is cast on the wall 14 of a photographic chamber from behind the gray wall 12.

FIGS. 11A and 11B illustrate arrays and signal connections formed therebetween with the modular light fixtures 20. FIG. 11A shows an array 60 formed with six modular light fixtures 20. The overhang of the heatsink 24 beyond the housing 22 allows for an offset area for cabling to be run between the light fixtures 20 in the array. The offset area provides for cable management of power and control lines between the individual lighting fixtures 20. FIG. 11B shows a signal bus 62 running between the light fixtures 20 in a three unit array 70.

Figure 12:
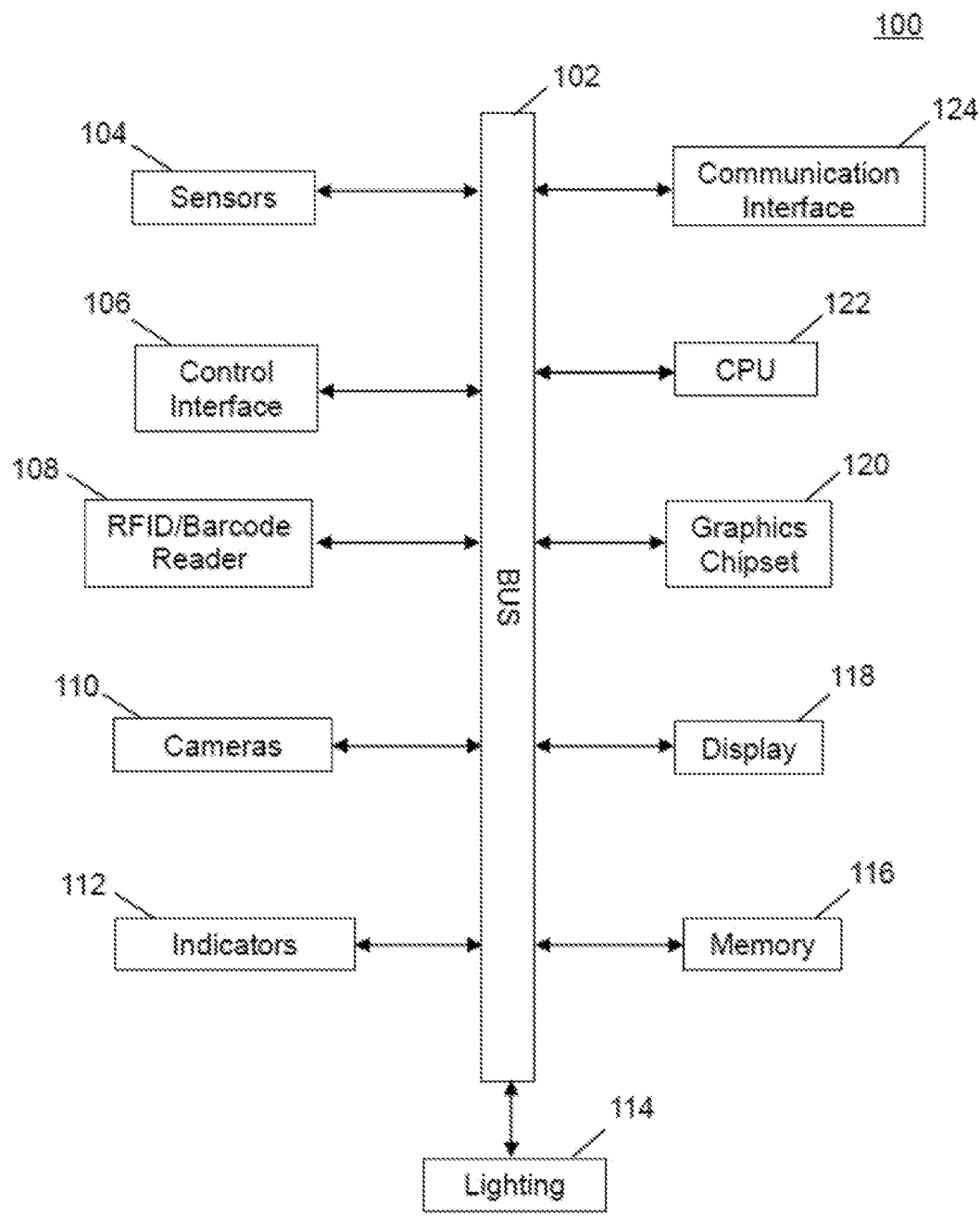
FIG. 12 is a system block diagram of the major components for photographing vehicles in accordance with embodiments of the invention.

FIG. 12 is a system block diagram 100 of the major components for photographing vehicles in accordance with embodiments of the invention. A central process unit (CPU) 122 coordinates and controls the overall operation of the photographing system 100 that may be operated in a photographic structure or booth. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with vehicle and client information is stored in Memory 116. Memory 116 is made up of read-only memory ROM and random access memory (RAM). Graphics chipset 120 drives a display. The display may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of a vehicle and the vehicle position. RFID/barcode 108 is a reader that detects and interprets tags mounted to vehicles or driver identification (ID) cards. Cameras 110 and lighting 114, which include embodiments of the modular light fixture 20, are controlled and sequenced by the CPU 122. The CPU may utilize the DMX 512 standard to control the lighting fixtures 20. Indicators 112 provide visual feedback to system users. In inventive embodiments, the central process unit (CPU) 122, or master and node computers, in the case of many cameras in use—these processing nodes speedup download and system throughput, and the CPU 122 coordinates and controls the plurality of cameras in the photographic structure. In specific inventive embodiments, a communication interface connects the plurality of cameras via one or more of wired and wireless links, optical drives, universal serial bus (USB), flash memory slot, and combinations thereof for receiving and sending data.

The use of sequenced and automated image capture allows for the rapid image processing of vehicles for auction sales, dealer records, as well as car condition assessments for rental agencies, fleet management companies, public safety agencies, municipal and government agencies, etc. A complete set of vehicle images are collected in between 5 and 90 seconds allowing for high throughput imaging associated with an auto auction or manufacturer.

Embodiments of the inventive enclosable photographic booth allow for a complete set of multi perspective high quality vehicle images to be obtained and recorded into a template or placed in a shared network folder in less than 90 seconds, and in some instances in approximately 5, 10, or 15 seconds. Thus, once a subject vehicle is photographed in the inventive enclosable oblong hemispherical domed photographic booth, the vehicle is available and ready for sale online based on the uploaded images and vehicle identification number (VIN) uploaded information. The rapid image processing and recordation of vehicle condition allows for new business models such as creating virtual or cyber dealerships where a wholesale customer never takes possession of a subject vehicle, and the vehicle is dropped shipped to the end retail customer. Photos obtained with the inventive system may be sold along with the subject vehicle for use by a purchasing used car retailer, and as it typically takes four days for the buyer to take delivery of the wholesale vehicle, with instant access to the vehicle photos the purchaser can start advertising the vehicle typically four days prior to physically taking possession of the vehicle.

Embodiments of the inventive photographic booth may utilize radio frequency identification (RFID) tags to identify and record vehicles as the vehicles are processed through the system. The RFID may be related to the vehicle identification number (VIN) of a vehicle to be processed. It is further appreciated that additional identifiers may be used illustratively including barcodes that relate to the VIN. Information related to the vehicle, such as vehicle make, model, body style, and color encoded in the VIN may be used to automatically adjust lighting. Further information that may be related to the RFID or barcode may include a dealership setting that may also indicate which dealer the vehicle is being shot for, and incorporate that dealer's specific preferences such as lighting style, file size and format, number of photo shots and angles to be recorded. RFID or bar code information, read manually or automatically may also be used to project text onto the background of the shot or overlay text onto the file during processing, such as price, dealer name, vehicle specifications, mileage, etc.

As a person skilled in the art will recognize from the previous detailed description and from the figures and claims, modifications and changes can be made to the preferred embodiments of the invention without departing from the scope of this invention defined in the following claims.

The invention claimed is:

1. A modular light fixture comprising:
   a housing;
   a heatsink coupled to the housing;
   a lighting lens coupled to a top surface of the heatsink; and
   one or more fans within the housing, wherein a light spread of the lighting lens is configured to be changed by de-coupling the heatsink from the housing, rotating the heatsink relative to the housing, and re-coupling the heatsink to the housing.

2. The modular light fixture of claim 1, further comprising an airline with a set of nozzles that are configured to supply air in periodic bursts to clean the one or more fans.

3. The modular light fixture of claim 1, further comprising an airline with a set of nozzles that are configured to supply a continuous supply of air to cool the modular light fixture.

4. The modular light fixture of claim 1, further comprising additional modular lighting fixtures that are joined in an array using a signal bus.

5. The modular light fixture of claim 1, wherein the heatsink comprises an overhang extending beyond an edge of the housing, the overhang creating an offset allowing a cable to pass between the modular light fixture and additional modular lighting fixtures arranged in an array.

6. The modular light fixture of claim 5, wherein the housing has an approximately box shape and the heatsink is coupled on top of the housing.

7. The modular light fixture of claim 1, wherein the light spread of the lighting lens changes to a sundog.

8. A method for using a modular light fixture, the method comprising:
   de-coupling a heatsink from a housing containing one or more fans;
   rotating the heatsink relative to the housing;
   coupling the heatsink to the housing; and
   activating a lighting lens coupled to a top surface of the heatsink, wherein a light spread of the lighting lens is changed, in response to the rotating the heatsink relative to the housing.

9. The method of claim 8, further comprising activating an airline with a set of nozzles that supply air in periodic bursts to clean the one or more fans.

10. The method of claim 8, further comprising activating an airline with a set of nozzles that supply a continuous supply of air to cool the modular light fixture.

11. The method of claim 8, further comprising joining two or more modular lighting fixtures in an array using a signal bus.

12. The method of claim 8, further comprising:
   arranging two or more modular lighting fixtures in an array; and
   passing a cable between the two or more modular lighting fixtures through an offset created by an overhang of the heatsink, the overhang extending beyond an edge of the housing.

13. The method of claim 8, wherein the housing has an approximately box shape and the heatsink is coupled on top of the housing.

14. The method of claim 8, wherein the light spread of the lighting lens changes to a sundog.

15. A method of manufacturing a modular light fixture, the method comprising:
   arranging one or more fans within a housing;
   coupling a lighting lens to a top surface of a heatsink; and
   coupling the heatsink to the housing, wherein a light spread of the lighting lens is configured to be changed by de-coupling the heatsink from the housing, rotating the heatsink relative to the housing, and re-coupling the heatsink to the housing.

16. The method of claim 15, further comprising placing an airline with a set of nozzles that supply air in periodic bursts to clean the one or more fans.

17. The method of claim 15, further comprising placing an airline with a set of nozzles that supply a continuous supply of air to cool the modular light fixture.

18. The method of claim 15, further comprising joining two or more modular lighting fixtures in an array using a signal bus.

19. The method of claim 15, further comprising:
   arranging two or more modular lighting fixtures in an array; and
   passing a cable between the two or more modular lighting fixtures through an offset created by an overhang of the heatsink, the overhang extending beyond an edge of the housing.

20. The method of claim 15, wherein the housing has an approximately box shape and the heatsink is coupled on top of the housing.

* * * * *